United States Patent

[11] 3,592,511

| [72] | Inventor | John C. Hudelson<br>Fairview Park, Ohio |
|---|---|---|
| [21] | Appl. No. | 828,191 |
| [22] | Filed | May 27, 1969 |
| [45] | Patented | July 13, 1971 |
| [73] | Assignee | American Koyo Corporation<br>Cleveland, Ohio |

[54] HIGH SPEED WHEEL
4 Claims, 2 Drawing Figs.

[52] U.S. Cl.................................................. 301/63DD,
74/230.7, 152/393, 301/63 DT, 308/191
[51] Int. Cl.................................................. B60c 9/00
[50] Field of Search........................................ 152/58,
323, 324, 40, 48, 310, 49, 47, 393; 301/63

[56] References Cited
UNITED STATES PATENTS
1,636,483  7/1927  Nielsen......................... 152/393 X

| 1,716,311 | 6/1929 | Harris | 152/393 X |
| 1,932,289 | 10/1933 | Jarvis | 301/63 (DD) |
| 3,194,293 | 7/1965 | Kindley | 152/47 X |

Primary Examiner—Richard J. Johnson
Attorney—Lawrence E. Laubscher

ABSTRACT: A high-speed wheel including a rim, a resilient tire mounted concentrically on the rim, and annular washer means for positively maintaining the tire on the rim, the inner and outer peripheries of the washer extending into corresponding slots contained in the outer and inner peripheries of the rim and tire respectively. The washer is bonded to the tire and has a higher modulus of elasticity than that of the tire, whereby upon expansion of the tire relative to the rim during high-speed operation, the wheel can withstand shocks and distortion without the tire coming off of the rim.

PATENTED JUL 13 1971
3,592,511
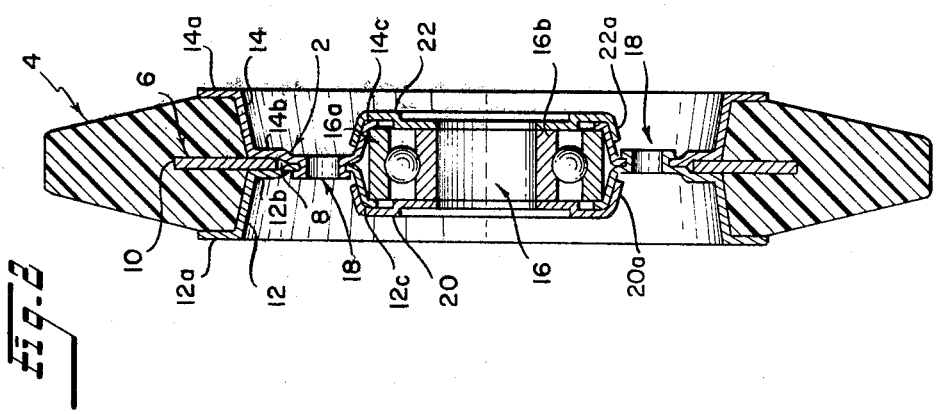
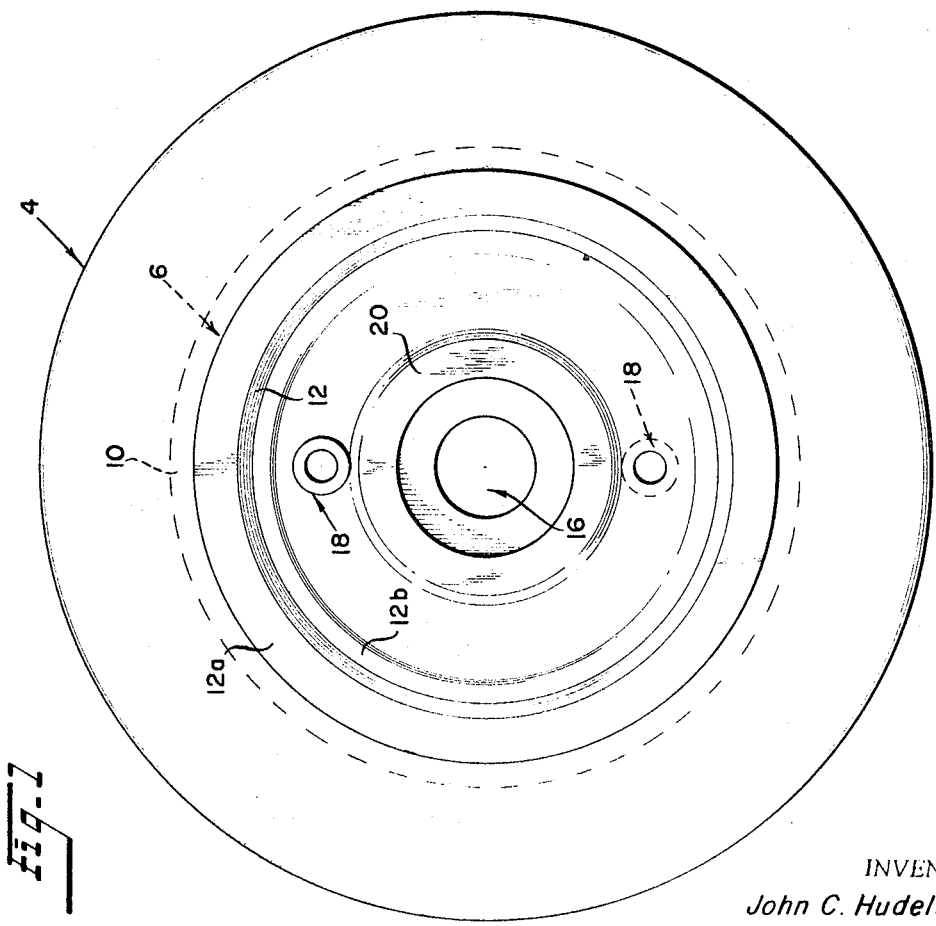
INVENTOR.
John C. Hudelson
BY
Lawrence E. Laubscher
Attorney

HIGH SPEED WHEEL

In small wheels having solid resilient tires mounted on rims, the problems occurs that during high-speed operation, the tire expands relative to the rim and is often displaced therefrom when a shock load is imparted to the wheel. One application where this presents a problem is in the small bogie wheels used on snowmobiles, which wheels often reach a speed approaching 100 miles per hour. In the case of a small wheel having a diameter on the order of 5 or 6 inches, the tendency is for the tire to radially expand to such a degree relative to the rim that the wheel becomes rather distorted and quite unstable. In the case where the tire has been permanently bonded to the rim or where the rubber tire has been molded on the rim in an attempt to secure together the wheel components, the shock loads to which the bogie wheels are subjected destroy the rubber to metal bond and eventually lead to tire separation.

In the patented prior art—as evidence by the U.S. Pat. to Robinson No. 2,655,684, Carter No. 2,673,469 and Cosmos, No. 2,673,470—various attempts have been made to provide wheel, pulley and roller constructions in which the tire is connected with the rim by mechanical anchoring means, adhesive bonds or the like. In addition to the high-speed operational difficulties referred to above, these prior constructions are somewhat complex and difficult to assemble, and generally are rather expensive to manufacture on a mass production basis.

Accordingly, the primary object of the present invention is to provide an improved high-speed wheel including planar, annular metal washer means for maintaining a resilient tire on the rim. The invention is characterized in that the inner and outer peripheries of the washer are contained in corresponding slots in the outer and inner peripheries of the rim and tire, respectively. According to a characteristic feature of the disclosed invention, the washer is permanently bonded to the tire, the inner peripheral portion of the washer being received for free radial sliding movement in the rim slot to permit controlled expansion and limited distortion of the tire during high-speed operation of the wheel.

A more specific object of the invention is to provide a high-speed wheel of the type described above wherein the rim means comprises a pair of annular sections the outer peripheries of which include generally parallel spaced flanges that engage the lateral surfaces on the inner peripheral portion of the tire to maintain it on the rim. The rim portions contain parallel spaced second annular portions spaced radially inwardly of the flange portions for defining the walls of the rim slot. The sections are permanently secured together in any suitable manner, as by welding, riveting, punching or the like.

According to another object of the invention, the wheel includes adjacent its inner periphery a ball bearing assembly that is secured between the inner peripheral portions of the rim sections. Shield means are provided for shielding the ball bearing races against damage by foreign objects.

Other objects and advantages of the invention will become apparent from a study of the following specification when viewed in the light of the accompanying drawing, in which:

FIG. 1 is a fragmentary side elevation view of the high-speed wheel; and

FIG. 2 is a sectional view along line 2–2 of FIG. 1.

Referring to the drawing, the high-speed wheel includes circular rim means 2 upon the outer periphery of which is mounted an annular resilient tire 4. In accordance with the present invention, means are provided for maintaining the tire on the rim and for providing controlled expansion and distortion of the wheel as the tire expands due to centrifugal force during high-speed operation. To this end, a planar annular washer element 6 is provided between the tire and the rim means, said washer having inner and outer peripheral portions that extend into corresponding slots 8 and 10 contained in the outer and inner peripheries of the rim and tire, respectively.

Preferably the resilient tire 4 is formed of rubber, a synthetic plastic material, or other suitable material, and the washer 6 is formed of metal (for example, stainless steel, aluminum, or the like). In accordance with an important feature of the invention, the washer is bonded to the tire in a conventional manner (for example, by vulcanizing or by an adhesive), said washer having a higher modulus of elasticity than that of the tire.

The rim means 2 includes a pair of annular sheet metal rim sections 12, 14 having adjacent their outer periphery generally parallel spaced flange portions 12a, 14a that engage the lateral walls of the inner peripheral portion of the tire, respectively. Radially inwardly of these flange portions, the rim sections have second generally parallel spaced portions 12b, 14b that define the walls of the rim slot 8. Radially inwardly of the second portions 12b, 14b, the rim sections include spaced third annular portions 12c, 14c that engage the outer race 16a of a centrally arranged ball bearing assembly 16. The rim sections are rigidly connected together by clench means 18 so that the tire is tightly clamped between the flange portions 12a, 14a and the outer bearings race 16a is tightly clamped between the third portions 12c, 14c.

Connected with opposite ends of the inner bearings race 16b are a pair of spaced annular metal shield members 20, 22 having curved protective portions 20a, 22a adjacent their outer peripheries that converge about the outer race 16a and the third portions 12c, 14c of the rim sections, respectively. These shield members protect the bearing races against damage by foreign objects.

In operation, as the speed of rotation of the wheel increases, the tire and washer expand radially due to centrifugal force. Since the inner peripheral portion of the washer is slidably guided in and supported by the slot 8, the tire is maintained on the rim in a positive manner, and owing to the high modulus of elasticity of the washer relative to that of the tire, controlled expansion and distortion of the wheel is afforded. Furthermore, since the washer 6 is free to move radially under shock loads, there is no destruction of the washer to tire bond, and, therefore, the wheel is especially suitable for rugged high-speed operation without causing the tire to come off the rim.

While the tire 4 has been illustrated as being a solid body formed by molding, it is apparent that the resilient tire could be provided with reinforcing materials or laminates, if desired.

What I claim is:

1. A high-speed wheel assembly, comprising annular rim means (2) including adjacent its outer periphery a pair of spaced parallel radially outwardly extending annular flange portions (12a, 14a), the outer periphery of said rim means containing between said flange portions a continuous radially inwardly directed circumferential slot (8); a resilient tire (4) mounted concentrically about and normally in peripheral engagement with the outer periphery of said rim means, the lateral surfaces of the inner peripheral portion of said tire being contained between and in contiguous engagement with said flange portions, respectively, the outer periphery of said tire extending radially outwardly beyond said flange portions; and a planar annular rigid washer permanently bonded at its outer periphery with the inner peripheral portion of said tire, said washer having a thickness that corresponds generally with the width of said slot, said washer being formed of a metal having a higher modulus of elasticity than that of said tire, the inner peripheral portion of said washer extending radially inwardly within said slot for free radial movement relative thereto, said washer having such an internal diameter relative to the outer diameter of said slot that when the tire and washer expand radially upon high-speed operation of the wheel, the inner peripheral portion of the washer will be continuously contained within the slot to maintain the tire on the rim.

2. Apparatus as defined in claim 1, wherein said rim means includes a pair of coaxially arranged companion annular sections, and further including means rigidly securing together said sections, each of said sections including adjacent its outer periphery a first annular portion defining one of said flanges, each of said sections including also radially inwardly of said first section an annular second section that defines one wall of said slot.

3. Apparatus as defined in claim 2, wherein said rim means includes ball bearing means including concentric annular outer and inner races, and further wherein said rim sections include adjacent their centers annular third portions between which said outer race is clamped.

4. Apparatus as defined in claim 3, wherein said rim means further includes a pair of parallel annular protective shield members arranged at opposite ends of said bearing means, each of said shield members being connected at its outer edge with said third portion of the adjacent rim section, respectively, said protective shield members extending radially inwardly opposite said inner race.